(12) United States Patent
Hamilton

(10) Patent No.: US 6,477,463 B2
(45) Date of Patent: Nov. 5, 2002

(54) MULTIPLE NODE NAVIGATION AND ROUTING SYSTEM FOR A DOMAIN TO BE USER NAVIGATED

(75) Inventor: Neil Douglas Hamilton, Sunderland (GB)

(73) Assignee: The University of Newcastle Upon Tyne, Newcastle Upon Tyne (GB)

( * ) Notice: Subject to any disclaimer, the term of this patent is extended or adjusted under 35 U.S.C. 154(b) by 0 days.

(21) Appl. No.: 09/780,339

(22) Filed: Feb. 12, 2001

(65) Prior Publication Data

US 2001/0018637 A1 Aug. 30, 2001

(30) Foreign Application Priority Data

Feb. 12, 2000 (GB) .............................................. 0003150

(51) Int. Cl.[7] .............................................. G01C 21/00
(52) U.S. Cl. ..................................................... 701/211
(58) Field of Search ............................ 701/211, 25, 23, 701/209

(56) References Cited

U.S. PATENT DOCUMENTS 4,780,714 A * 10/1988 Lofgen ........................ 180/168
5,426,667 A * 6/1995 van Zon ....................... 375/219
5,806,017 A    9/1998 Hancock
6,259,990 B1 * 7/2001 Shojima et al. ......... 340/825.19
6,259,991 B1 * 7/2001 Nysen ......................... 340/10.1

FOREIGN PATENT DOCUMENTS

| JP | 200028723 | 7/1998 |
| WO | WO 82/02271 | 7/1982 |
| WO | WO 98/35276 | 8/1998 |

* cited by examiner

Primary Examiner—Michael J. Zanelli
(74) Attorney, Agent, or Firm—Larson & Taylor, PLC

(57) ABSTRACT

A navigation and routing system for a domain to be navigated and including a plurality of nodes comprising, at each node, a passive element the identity of which is unique to the address of the associated node, and an active navigation device programmed with an electronic map of the domain and capable of receiving information from the passive elements, the arrangement being such that, for any given destination within the domain, and on reading of the passive element at a first node by the navigation device, routing information is displayed by the navigation device to direct the user to the next node in the route leading to his destination.

7 Claims, 2 Drawing Sheets

MULTIPLE NODE NAVIGATION AND ROUTING SYSTEM FOR A DOMAIN TO BE USER NAVIGATED

FIELD OF THE INVENTION

This invention relates to a navigation and routing system primarily for complex domains to be negotiated by users.

SUMMARY OF THE PRIOR ART

Large complex public buildings, as well as public spaces, can often pose a daunting navigational problem to able bodied users, as well as to individuals with impaired mobility or learning disabilities.

Traditionally these problems have been overcome by such means as map displays, plans, sign-boards, and similar devices for guiding the user to a destination. However in large environments, these means are of necessity very complex, and can only cater for the needs of a perceived majority. Hospital accident and emergency departments, for instance, often supplement the above means by providing a coloured line painted on the floor to assist patients in finding their way to the X-Ray department. Though an effective solution for this most commonly required route, it would be impossible to paint different coloured lines on the floor to the many, less frequented, referral departments.

There is therefore a need to improve methods for providing navigation and routing information for use by the public or other users in complex domains such as buildings and public spaces. Furthermore, and especially in the case of hospitals, any such system should be sufficiently adaptable to enable the specific requirements of persons with varying physical and cognitive ability to be able to make use of it.

It has been proposed to deploy electronic beacon based navigation devices at various decision points on the routes in question. However, such devices have the major disadvantage of requiring individual installation and the supply of power thereto, in addition to the cost of procurement. In a complex building having perhaps hundreds of decision points, junctions, intersections or the like, hereinafter referred to as nodes, the cost of providing such devices is prohibitive.

SUMMARY OF THE INVENTION

According to the present invention there is provided, for a domain to be navigated and including a plurality of nodes, a navigation and routing system characterised by, at each node, a passive element the identity of which is unique to the address of the associated node, and an active navigation device programmed with an electronic map of the domain and capable of receiving information from the passive elements, the arrangement being such that, for any given destination within the domain, and on reading of the passive element at a first node by the navigation device, routing information is displayed by the navigation device to direct the user to the next node in the route leading to his destination.

Thus it will be appreciated that the expensive powered beacons of the prior art are replaced by relatively inexpensive passive elements each uniquely identifying a specific node or decision point within the domain, and a single navigation device capable of sequentially reading the passive elements to determine their details, processing said details and then, for a given destination, displaying directions for the next stage towards said destination.

Each passive element may comprise a contactless smart card, conveniently the size of a standard credit card, containing electronic circuitry, typically processor chips and non-volatile memory, powered by inductive coupling energy from the active navigation device.

Alternatively the coupling between the passive elements and the navigation device may be optical, electromagnetic or magnetic.

DETAILED DESCRIPTION OF THE PREFERRED EMBODIMENTS

A typical implementation of the invention consists of an array of contactless smart-cards or node cards 2 statically distributed around an area, such as a complex building, to be navigated by a person unfamiliar with the layout of features within the building such as, but not limited to, passageways, corridors, stairways, elevators and wheel-chair ramps, and the junctions between such features. The node cards are located at appropriate decision points or nodes, and are programmed with a unique electronic address associated with the location of that node.

Figure 4:
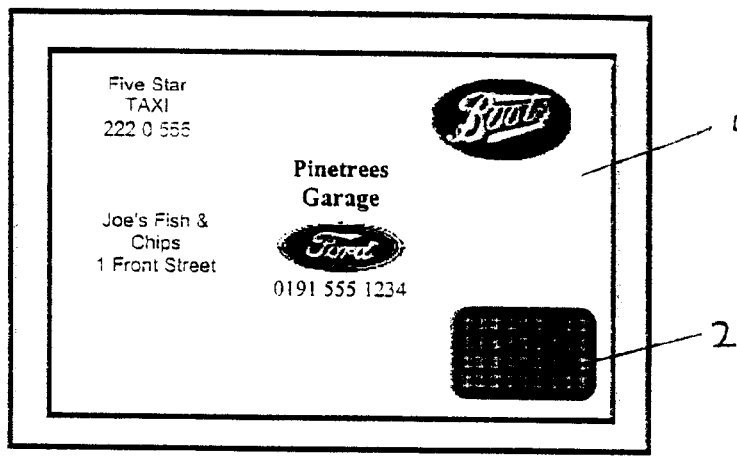
FIG. 4 is a view of a passive element of a system according to the invention incorporated in a sign board.

The contactless smart-cards 2 may be embedded within notice-boards in order to make the associated node easily visible to the user. In certain circumstances, and as shown in FIG. 4, the card 2 may be embedded in a notice-board 4 carrying advertising material as well as instruction as to how to use the node point.

The user is issued with a contactless smart-card navigator device 6 which can be programmed by means of a destination card with the user's intended destination, together with other information relevant to optimising the route of the user from a starting point to the destination. The navigator device 6 is also provided with means to compute the optimal route for the particular user to the programmed destination from any node in the system, and to give a visual indication as to the route to be taken from the node point.

Figure 2:
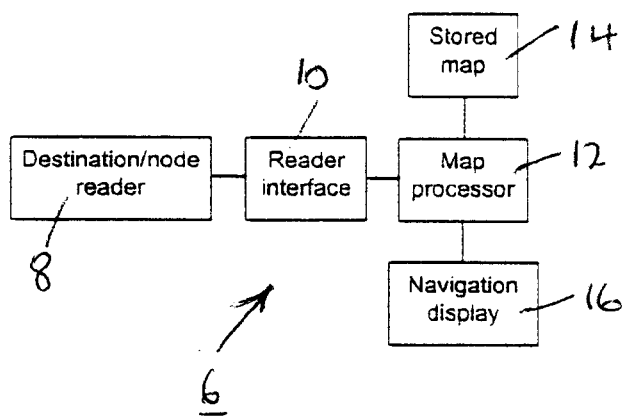
FIG. 2 is a block diagram of a navigation device of a system according to the invention.

A typical navigator device 6 is illustrated schematically in FIG. 2 and comprises a destination/node reader 8, a reader interface 10, a map processor 12, a stored map 14 of the associated building, domain or the like, and a navigation display 16.

Figure 3:
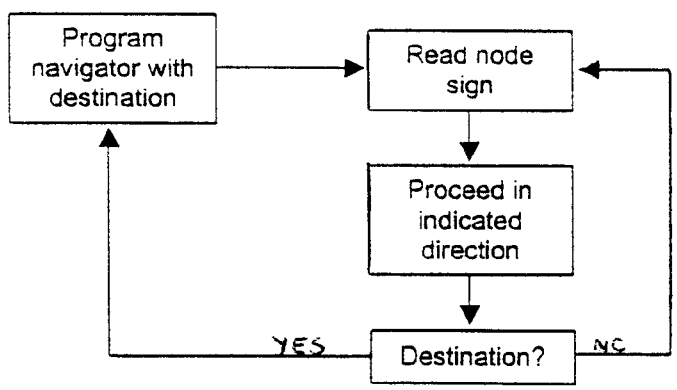
FIG. 3 is a block diagram of a system according to the invention in use.

As illustrated in FIG. 3, the steps associated with a user navigating from a starting point to a destination comprise initial programming of the navigator device 6 with the destination, proceeding to the first node and reading the passive smart-card at that node, inspecting the resultant display on the navigator device, and proceeding to the next node. If this is the destination, navigation is complete. If there are further nodes to negotiate, the steps of reading, inspecting the resultant display and proceeding to the next node/destination are repeated.

Figure 5:
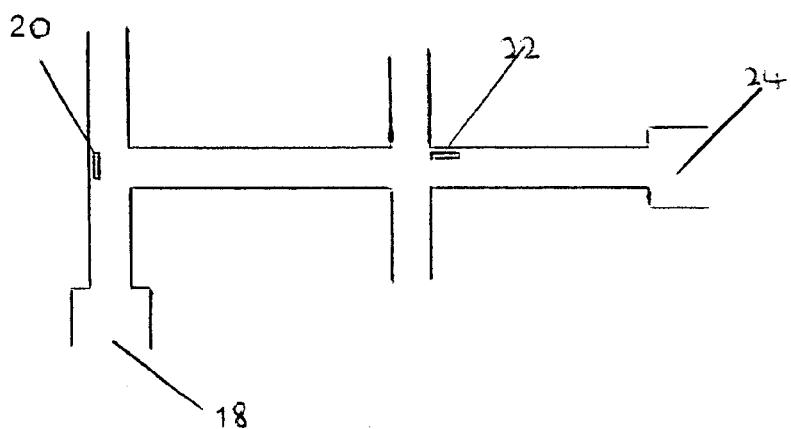
FIG. 5 is a plan view of a part of a domain to be navigated by a system according to the invention.

Referring more specifically to FIG. 5, which illustrates a small part of a single floor in a complex building, the visitor, on entering the reception area 18, is received by a receptionist who programs the navigator device 6 with the appropriate destination card. On entering the main building, the visitor seeks out the first node or decision point 20, which is usually chosen such that it is a natural decision point in negotiating the building labyrinth. A small plastic notice fixed to the wall identifies the node, and textual instructions inviting the visitor to place the navigator device 6 near to it are included. On doing so, the contactless smart-card embedded in the notice activates and transmits its unique node identification code to the navigator device 6. The navigator device 6 then computes the optimum route to the destination from that node, and issues instructions on its display 16 by means of a visual arrow as to the direction to proceed. By way of example, it is assumed that the instructions given were to proceed towards the second node 22, where a similar interrogation takes place, and instructions are then given to proceed to the destination 24.

The visitor may be required to seek new destinations within the building, or, finally, to seek an exit from it. Each destination point or node will have a series of destination cards available thereat to re-programme the navigator device 6 with a new destination, which may also include an exit.

Thus it will be appreciated that navigation to a destination is by means of a number of discrete stages or hops from node to node until the destination is reached. Routing information within the navigator device is obtained by processing details of the navigation domain, for example as shown in FIG. 1, held in the form of nodes each having a unique identity, and links each having a length and, possibly, a weighting, from a database using an implementation of Floyd's algorithm to produce a route cost matrix and a hop matrix as follows:

| | | | x = Start, y = destination | | | | |
|---|---|---|---|---|---|---|---|
| | 1 | 2 | 3 | 4 | 5 | 6 | 7 |
| | | | Route cost matrix (least cost) | | | | |
| 1 | 2 | 4 | 3 | 1 | 5 | 2 | 3 |
| 2 | 4 | 8 | 4 | 5 | 5 | 5 | 7 |
| 3 | 3 | 4 | 2 | 3 | 3 | 1 | 3 |
| 4 | 1 | 5 | 3 | 2 | 6 | 3 | 2 |
| 5 | 5 | 5 | 3 | 6 | 6 | 3 | 6 |
| 6 | 2 | 5 | 1 | 3 | 3 | 2 | 4 |
| 7 | 3 | 7 | 3 | 2 | 6 | 4 | 4 |
| | | | Route hop matrix | | | | |
| 1 | 4 | 1 | 6 | 1 | 6 | 1 | 4 |
| 2 | 2 | 1 | 2 | 1 | 2 | 3 | 3 |
| 3 | 6 | 3 | 6 | 3 | 3 | 3 | 3 |
| 4 | 4 | 1 | 4 | 1 | 3 | 1 | 4 |
| 5 | 6 | 5 | 5 | 3 | 3 | 5 | 3 |
| 6 | 6 | 3 | 6 | 1 | 6 | 3 | 3 |
| 7 | 4 | 3 | 7 | 7 | 3 | 3 | 4 |

Figure 1:
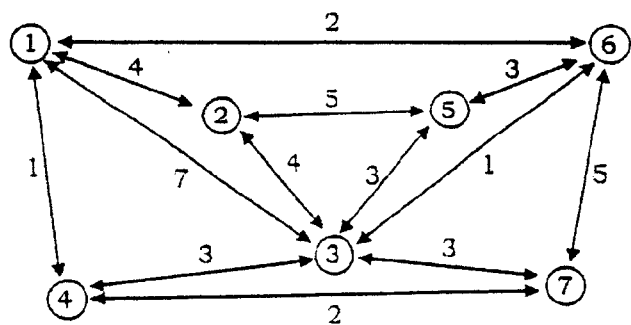
FIG. 1 is an illustration of a domain capable of being navigated by the system of the invention.

Referring to FIG. 1, in which the encircled numbers denote nodes or destination points in a domain, and in which the other numbers between adjacent nodes indicate the costs associated with the route between said nodes, and referring to the above tables, a simple navigation process from encircled node 5 to encircled node 1 in FIG. 1 involves first of all looking up the route cost matrix in which x=5 and y=1, showing that the route cost is 5 (3+2). The first stage of the route is then looked up in the route hop matrix with x=5 and y=1, which indicates that the next node in the route is encircled node 6.

This procedure is then repeated using the route hop matrix with x=6 and y=1, which indicates that the next node in the route is encircled node 1, namely the destination.

As a simple algorithm:
when current node number <> destination node number
  look up next node number from route hop matrix;
  move to next node;
  read node number;
end.

The navigator device 6, when based on inductive coupling with the passive smart-cards, may be capable of coupling sufficient energy to enable interrogation at a distance from the smart-cards. The basic information displayed on the navigator device will be the direction to take towards the next node, although this information may also include the distance to the next node, and may be modified in accordance with a pre-programmed knowledge of the user's access requirements—for example a wheelchair may be channelled along a different route from that offered to an able bodied user.

A time and date stamped record of all nodes visited within a journey may be retained within the navigator device 6 for later analysis and use, for example to optimise the siting of nodes, to record areas of the building visited for security purposes etc. The smart-cards at the individual nodes may also have a storage capability, and could retain details of the navigator devices recently used, this providing further security information.

Figure 6:
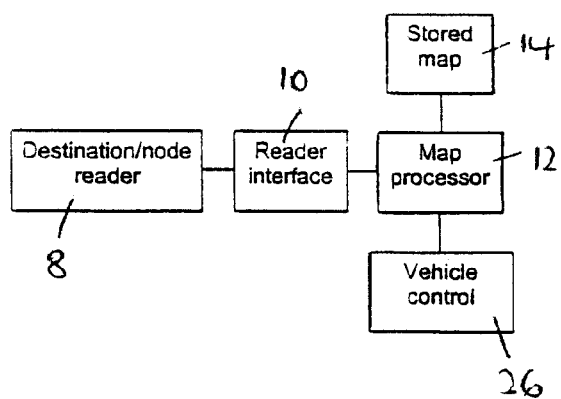
FIG. 6 is a block diagram of a navigation system according to the invention and applied to an automated guided vehicle (AGV).

The intrinsic flexibility of the passive node solution renders the system of the invention particularly suited to automated guide vehicles (AGV). The nodes could be located at junctions in the vehicle track, and the navigation system would control the vehicle directly. FIG. 6 illustrates schematically such a system in which, compared with FIG. 2, the navigator device display 16 is replaced by a vehicle control system 26.

Although described as incorporating smart-cards as the passive elements inductively coupled to the navigator device, the system of the invention is not limited to such an arrangement. For example, the passive elements may comprise bar codes, and the navigator device may be a bar code reader, while other optical arrangements, such as those in which light is fired onto passive elements by the navigator device and is reflected back to the navigator device for interpretation, are within the scope of the invention.

Additionally, the coupling between the passive elements and the navigator device may be electromagnetic or purely magnetic. Other modifications and variations will be apparent to those skilled in the art.

What is claimed in:

1. A navigation and routing system for a domain to be navigated and including a plurality of nodes, the system comprising at each node, a passive element the identity of which is unique to the address of the associated node, and an active navigation device programmed with an electronic map of the domain and capable of receiving information from the passive elements, the arrangement being such that, for any given destination within the domain, and on reading of the passive element at a first node by the navigation device, routing information is displayed by the navigation device to direct the user to the next node in the route leading to his destination.

2. A system as claimed in claim 1 in which each passive element comprises a contactless smart card containing electronic circuitry powered by inductive coupling energy from the active navigation device.

3. A system as claimed in claim 1 in which the coupling between the passive elements and the navigation device is any one of optical, electromagnetic and magnetic.

4. A system as claimed in claim 2 in which the smart cards are embedded within associated notice boards.

5. A system as claimed in claim 1 together with a plurality of destination cards for programming the navigation device with any one of a number of intended destinations for a user.

6. A system as claimed in claim 1 in which the routing information displayed by the navigation device comprises distance and direction to the next node.

7. A system as claimed in claim 1 in which the navigation device comprises a destination/node reader, a reader interface, a map processor, a stored map of the domain, and a navigation display.

\* \* \* \* \*